United States Patent [19]

Rapp et al.

[11] 4,318,177

[45] Mar. 2, 1982

[54] METHOD OF FEEDING WATER TO A CONCRETE MIX

[75] Inventors: Joachim Rapp, Weingarten; Peter Bittmann, Gaggenau, both of Fed. Rep. of Germany

[73] Assignee: Elba-Werk Maschinen-Gesellschaft mbH & Co., Ettlingen, Fed. Rep. of Germany

[21] Appl. No.: 105,734

[22] Filed: Dec. 20, 1979

[30] Foreign Application Priority Data

Dec. 21, 1978 [DE] Fed. Rep. of Germany ....... 2855324

[51] Int. Cl.[3] .............................................. G06F 15/20

[52] U.S. Cl. .................................... 364/502; 364/468; 364/577; 364/300; 364/503

[58] Field of Search .......................... 364/502, 577, 573, 364/575, 477, 300, 468, 503

[56] References Cited

U.S. PATENT DOCUMENTS

| | | | |
|---|---|---|---|
| 3,566,091 | 2/1971 | Bay | 364/503 X |
| 3,609,316 | 9/1971 | Brosset et al. | 364/502 X |
| 3,959,636 | 5/1976 | Johnson et al. | 364/502 X |

FOREIGN PATENT DOCUMENTS

| | | |
|---|---|---|
| 1949441 | 9/1969 | Fed. Rep. of Germany . |
| 1784920 | 9/1971 | Fed. Rep. of Germany . |
| 1683778 | 5/1978 | Fed. Rep. of Germany . |
| 2545792 | 8/1978 | Fed. Rep. of Germany . |
| 2712210 | 9/1978 | Fed. Rep. of Germany . |

OTHER PUBLICATIONS

Optimization of a Cement Mill by Correlation Technique, Simulation Results, L. Keviczky, et al., Simulation Systems, Conference Proceedings of the 8th AICA Congress, 23-28 Aug. 1976, pp. 737-745.

*Primary Examiner*—Edward J. Wise
*Attorney, Agent, or Firm*—Montague & Ross

[57] ABSTRACT

A method of and an apparatus for controlling the water added to concrete batches wherein for a given concrete recipe and batch size, while mixing same, a series of empirical values of water quantity and consistency of the resulting mix are determined by initially feeding a quantity of water to the batch reduced by an amount equivalent to the moisture content of the aggregates of the batch at maximum intrinsic moisture content and thereafter incrementally adding water while measuring the consistency after each water addition, and these values are stored for the respective recipe and batch size. For the addition of water to a further batch of the recipe, while mixing the further batch, an initial quantity of water is added to the further batch which is not reduced by the quantity of water equivalent to the moisture contents of the aggregates and the consistency of the further batch after the initial addition of water thereto is measured. Interpolation between stored water values corresponding to stored consistency values neighboring the measured consistency yields a first water quantity and interpolation between stored water values corresponding to stored consistency values for a set point consistency of the further batch saves a second water quantity. The additional water quantity equal to the difference is added in a single increment.

7 Claims, 4 Drawing Figures

METHOD OF FEEDING WATER TO A CONCRETE MIX

FIELD OF THE INVENTION

Our present invention relates to a method of controlledly feeding water to a concrete mix and, more particularly, to a system responsive to the consistency of a concrete mix for metering water thereto.

BACKGROUND OF THE INVENTION

In the art of preparing concrete, the water component plays a critical role, for example, the water-cement factor (W/C) determines the ultimate compressive strength of the concrete and other characteristics of the mix during and prior to setting. Apart from the need to establish a certain water-cement factor, commercial applications of concrete require that it be prepared with a predetermined consistency which is fully reproducible and maintained constant.

A difficulty, however, arises because the consistency of concrete mix cannot be established solely by the addition of a given amount of water thereto. The components of the mix, generally the sand and gravel, have varying moisture contents which may change from the start of the feed of the component to the mixer to the end or from charge to charge. The water supplied to the mix must be added in greater or lesser quantity, depending upon the moisture content of the other components, to obtain a predetermined consistency.

There are, of course, systems for controlling the consistency of a concrete mix. For example, in the German Pat. No. 17 84 920, electrodes are provided in the mixer to respond to the electrical resistance of the mix, the resistance being a function of the consistency.

In German Pat. No. 16 83 778, a system is described which responds to the power required to drive the mixer, this power demand being likewise a function of the consistency of the concrete mixture. Finally, in German patent document (open Application-Offenlegungsschrift) DE OS No. 27 12 210, a dielectric sensor for the moisture in the mix is provided to enable a control system to regulate the consistency.

Thus in modern concrete preparation, the electrode sensing of the electrical resistance of the mixture or the measurement of the mixer-drive power have found practical application and indeed systems for controlling the consistency of concrete mixtures heretofore have for the most part been based on one or the other of these measuring processes.

Practical experience with these techniques has, however, shown that there is a dependency of the electrical resistance of the mix or of the power demand for the mixer upon the consistency which is nonlinear. For example, the change in the output signal per increment of consistency change is initially relatively large and falls off with increasing water content of the mix as will be described in greater detail below.

In the case of electrical resistance measurements of consistency, the resistance falls off sharply with the beginning of water addition to a point at which further water addition does not materially change the measurement. In the case of power demand for the mixer, there is initially no reaction with the addition of water to the mix and only when a certain amount of water has been added is there a sharp drop in the power demand. At this point the power change per increment of consistency change is initially relatively greater and falls off with increasing water addition.

Furthermore, these experiments have shown that the magnitudes and patterns of the measured values depend upon the composition of the mix, the amount of the mix and other variables which detrimentally affect efforts to obtain a fully reproducible consistency of concrete mixes.

Neither of the two measuring techniques discussed above, moreover, appears to adequately encompass the total consistency range in concrete production. The values obtained are also subject to sharp fluctuations which can be superimposed on the measurements and tend to have a certain periodicity which depends upon the speed of rotation of the mixer. These fluctuations result, in turn, in high tolerances which must be observed to the detriment of accuracy in establishing a given consistency by conventional control techniques.

It has been proposed, for example, to provide RC (resistance/capacitance) networks to smooth out the superimposed fluctuations at least in part. Such networks have the disadvantage that they introduce a delay in the measuring process, the delay increasing the mixing duration with all of the disadvantages that can be expected from such an increase. For example, the increased mixing time results in greater energy consumption, more significant wear of the mixer and reduction in the mixing efficiency.

When the electrode system is used, moreover, a plurality of electrodes must usually be provided at respective locations in the mixing apparatus, e.g. the mixing drum or trough, and the output values or signals are averaged to provide an actual-value signal which is a mean of the signals from the various electrode stations. Naturally this need for a number of electrode stations and averaging increases the capital and maintenance cost since the electrodes are continuously subject to wear and must be frequently readjusted, repaired or replaced.

In conventional systems the control of the water addition generally is carried out in such a manner that water is continuously fed to the mix until the set point value of the consistency is obtained. Obviously this requires that the water be fed relatively slowly so that it can be readily blended with the remainder of the mix.

It has also been proposed to introduce continuously a portion of the necessary water over a first mixing period and then to interrupt the water feed for an additional mixing period, whereupon a reduced quantity of water is supplied, followed by another mixing time with the alternations of water feeding and interruptions continuing until the desired consistency is obtained. The mixing and water-feed intervals in many cases are held constant while in other cases they can be varied.

All the conventional control procedures outlined above have the common disadvantages that they require a relatively long time before the set point consistency or desired consistency is reached. Since the components of the mix are continuously agitated in the mixer during this period, the wear of the moving parts of the mixer and those parts which are contacted by the moving mixture is relatively high, energy consumption is also high and the mixing efficiency over the entire mixing period is low.

To improve the efficiency, larger mixers have been proposed although this has the disadvantage of higher capital cost and impracticability if smaller volumes of a mix are desired.

OBJECTS OF THE INVENTION

It is the principal object of the present invention to provide an improved method of controlling the addition of water to a concrete mix whereby disadvantages of the prior art, some of which have been enumerated above, are obviated.

Another object of our invention is to provide an improved system for controlling the addition of water to a concrete mix automatically and with a minimum of control lag.

It is also an object of the invention to provide a method of preparing a concrete mix which enables control of the addition of water over the entire consistency range, which enables the water addition to respond to the intrinsic moisture (initial moisture content) of other components of the mix, and which can reliably and reproducibly provide a predetermined consistency of the concrete.

Still another object of our invention is to provide a method of metering water to a concrete mix which has the effect of reducing the mixing time by comparison with prior-art systems and hence reduces the wear of the mixer and improves the energy efficiency of the mixing process.

SUMMARY OF THE INVENTION

These objects and others which will become apparent hereinafter are attained, in accordance with the present invention by a method in which a series of runs with various concrete components and quantities is made with each component having the maximum intrinsic moisture content and the quantity of water needed for each mix or combination for each respective consistency level is ascertained and the respective water values and consistency values are stored. According to the invention, for the preparation of corresponding mixes (albeit with the more customary lower intrinsic moisture contents of the components), a quantity of water is added which corresponds to the predetermined and recorded quantity and the interpolation to the set point value of the concrete consistency is then effected by metering or feeding the additional quantity while monitoring the consistency e.g. by one of the techniques previously described.

According to an important feature of the invention, when compositions between those which correspond to recorded data are used, an automatic interpolation is effected to determine the water quantity corresponding to the set point value of the consistency of such an intermediate composition.

For each different concrete recipe and for each different quantity of the mixture, therefore, separate empirical values are established and tabulated or stored in a storage, e.g. an electronic memory, from which the data can be read as empirical values for corresponding concrete recipes and the same batch quantities.

Preferably the reliability of the measured values is improved by utilizing different methods for the various concrete consistency ranges in the same measuring apparatus or unit. For example, for very dry concretes and concretes in the early part of the consistency versus water addition curve, the measured value can be the electrical resistance while for concretes beyond the early portion of the curve, the mixer drive characteristics can be used as the measured value since these characteristics are most sensitive in the later portions of the consistency curve.

The advantage of using plural types of measurements, each with the greatest sensitivity in the respective limited portion of the consistency range permits extreme values to be discarded and facilitates linearization of the measured values and hence improved precision.

To eliminate the effect of extremes upon the measured values and upon the mixing process, it has been found to be advantageous to detect the measured value at least a plurality of times per rotation of the mixer and then to average the individual measurements for use in the control process.

The system which is used for carrying out the method of the present invention can comprise a concrete mixer of any conventional design, e.g. a rotary mixer, which can have its rotary member connected to a transducer to provide an output signal representing the load, torque or mixing power and hence representing an instantaneous value of the actual consistency of the concrete.

The output of this transducer is applied to a signal-processing circuit which serves to linearize the measurement, the signal-preparation circuit feeding an analog digital converter which is provided ahead of an averaging circuit which determines the mean value of the signal or measurement. The tachometer of the mixer supplies its signal to the averager so that the signal output of the latter is synchronized with the rotation of the mixer. The averagers are connected to a system bus (data bus) which is controlled by a microprocessor effecting the feed of water in accordance with previously recorded tabulated data and affording, in addition, direct readout of the measured value as well as related data.

The same microprocessor can be used for registering the data in the memory and for controlling a magnetic valve in the water-feed line.

The apparatus can also include means for producing a readout of the achieved consistency as well as means for measuring the water quantity introduced into the mix and to initiate the operation.

The water feed line can include, according to the invention, a water counter producing a counting pulse for each increment (0.1 to 1 liter) of water addition, the counting pulse being provided to an input circuit which sums the counting pulses and thus establishes the total water supplied at any point in time, this value being displayed or indicated.

The input of preselected values and the selection of all process data are effected by keying, i.e. through a keyboard with the information introduced being directly displayed on the alpha-numeric or like readout facility.

The method aspects of the present invention thus provide that the control process for achieving the desired set point consistency for each concrete recipe and batch quantity, after the supply of an initial quantity of water (hereinafter described as the "prewater quantity"), reduced from the total water necessary for this consistency by an amount representing the moisture in the aggregate when the latter is at its highest possible moisture content, is effected only once, the thereby measured values, namely, the actual value of the water added and the associated consistency value, are stored as empirical values.

For all further equivalent mixtures, after supply of an unreduced predetermined prewater quantity, the additional water for a particularly desired consistency is determined from the stored empirical values and can be added in a single operation.

Furthermore, interpolation between neighboring empirical values permits the water corresponding to the consistency set point value to be reduced by the water quantity corresponding to the actual value of the consistency and predicts the additional water quantity to be metered to the mixture (to which the predetermined prewater quantity has previously been supplied).

The present invention can thus be described as a process for controlling the water addition in batch preparation of concrete (or of adding water to a concrete batch) using the principle of indirect consistency measurement by the electrical resistance of the mix or the effect upon the operation of the mixer.

According to the invention, in a first process step and in a conventional way a relatively large prewater quantity is added to a variety of concrete recipes each prewater quantity being reduced from the total water by the amount of water which would normally be present in the aggregate of the recipe at its highest possible intrinsic moisture content, whereupon relatively small and equal amounts of water are added thereafter to achieve the predetermined concrete consistency.

Each consistency value upon each addition of water and the corresponding absolute water quantity to achieve that consistency for a variety of concrete recipes are converted into electrical signals and stored in a "table."

All further concrete batches are then prepared as follows:

(A) A relatively large second prewater quantity is added which is greater than the first-mentioned prewater quantity.

(B) The consistency of the mixture is determined to provide an output representing the actual consistency.

(C) The table is scanned to determine concrete consistency obtained in (B) and by interpolation a corresponding actual water value for the actual consistency is determined from the water values.

(D) Similarly, the concrete consistency values flanking the set point consistency are determined from the table and by interpolation the total water quantity corresponding to the set point consistency is evaluated from the total water values of the concrete consistencies recorded in the table.

(E) The difference is determined between the total water quantity and the actual water quantity and a quantity of water is supplied. Advantageously, this additional water is supplied only once.

The most significant advantages of the process and the apparatus of the present invention derive from the fact that the total water required for a given consistency can be supplied in short order regardless of the degree of moisture in the aggregate for the concrete and over the entire consistency range from the driest to the loosest mixes. Since the tabulated or stored values can cover this range with a large number of values or points, the interpolation creates no difficulty and permits both wide variation in recipe and wide variation in batch size. The mixing time can be sharply reduced and the total water quantity can be reproducibly achieved with high precision especially when the measurements are taken in a number of times for each rotation of the mixer and a mean is used of the measured values.

BRIEF DESCRIPTION OF THE DRAWING

The above and other objects, features and advantages of the present invention will become more readily apparent from the following description, reference being made to the accompanying drawing, in which.

SPECIFIC DESCRIPTION

Figure 1:
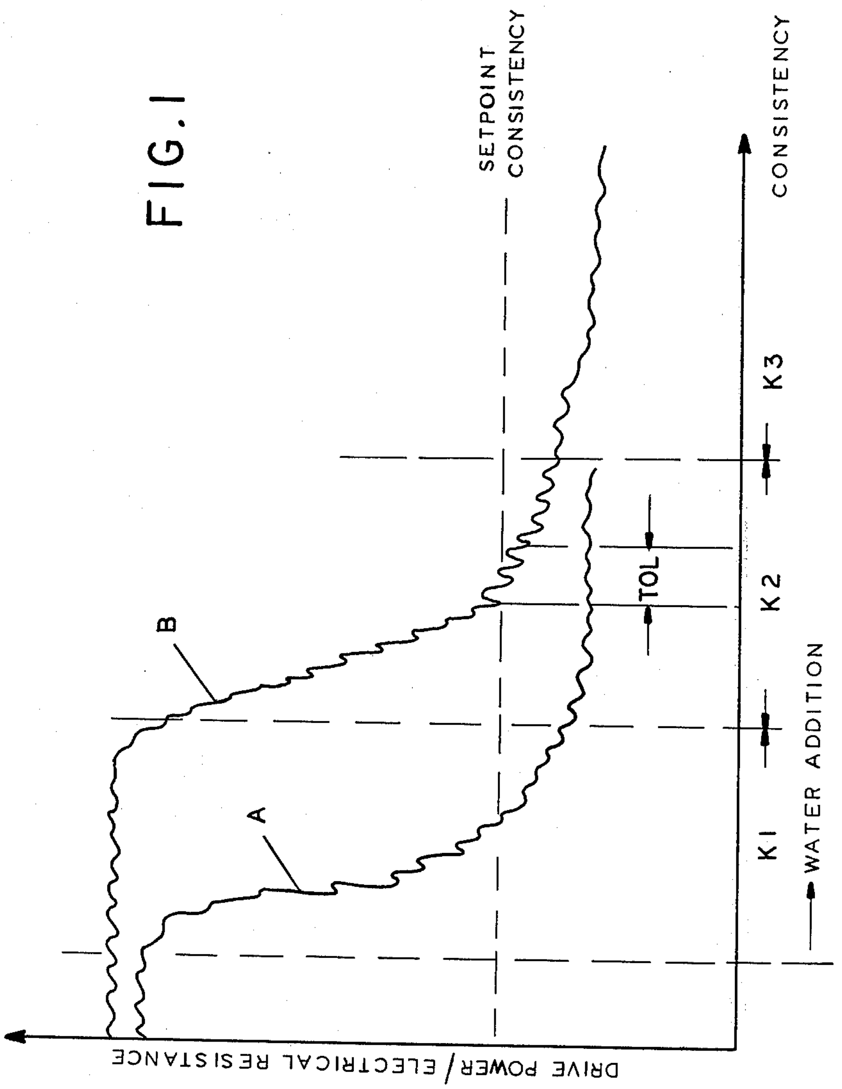
FIG. 1 is a diagram showing the results of consistency measurements by electrical resistance and effect upon the mixer drive.

As can be seen from FIG. 1 in which the proportion of water increases along the abscissa while the consistency declines, as is represented by the reduction in the mixing power or electrical resistance (plotted along the ordinate), the curve A representing the electrical resistance of the mixture breaks downwardly earlier than the curve B representing the power required by the mixer (equivalent to the applied torque or drag of the mixture on the mixer).

From curves A and B it can be seen that the dependency of the measurement upon the consistency is not uniform and is certainly not linear. Rather the measured value per increment of consistency change is initially relatively large and becomes smaller with increasing water addition.

The electrical resistance of the mixture (curve A) falls sharply with the beginning of water addition and levels at the transition between consistency K1 and K2 and thereafter manifests little change with further water addition.

By contrast, the power demand for operation of the mixer (curve B) initially shows little reaction to the addition of water but then falls sharply in the transition from the region K1 to the region K2 when the drag change per consistency change is relatively large. Within the K2 region the drag change tends to level off and with further water addition becomes vanishingly small.

It will be apparent from this diagram, therefore, that the use of either one of the measuring techniques alone to determine consistency of a concrete batch is unsatisfactory since each responds effectively only in a limited portion of the consistency range.

The diagram also shows that it is not possible to eliminate from such measurements relatively large fluctuations which periodically are superimposed on the measurement values and depend upon the speed of the mixer. The tolerances (TOL) which result from these fluctuations preclude effective automatic consistency control. These problems are avoided by the system of FIG. 2.

Figure 2:
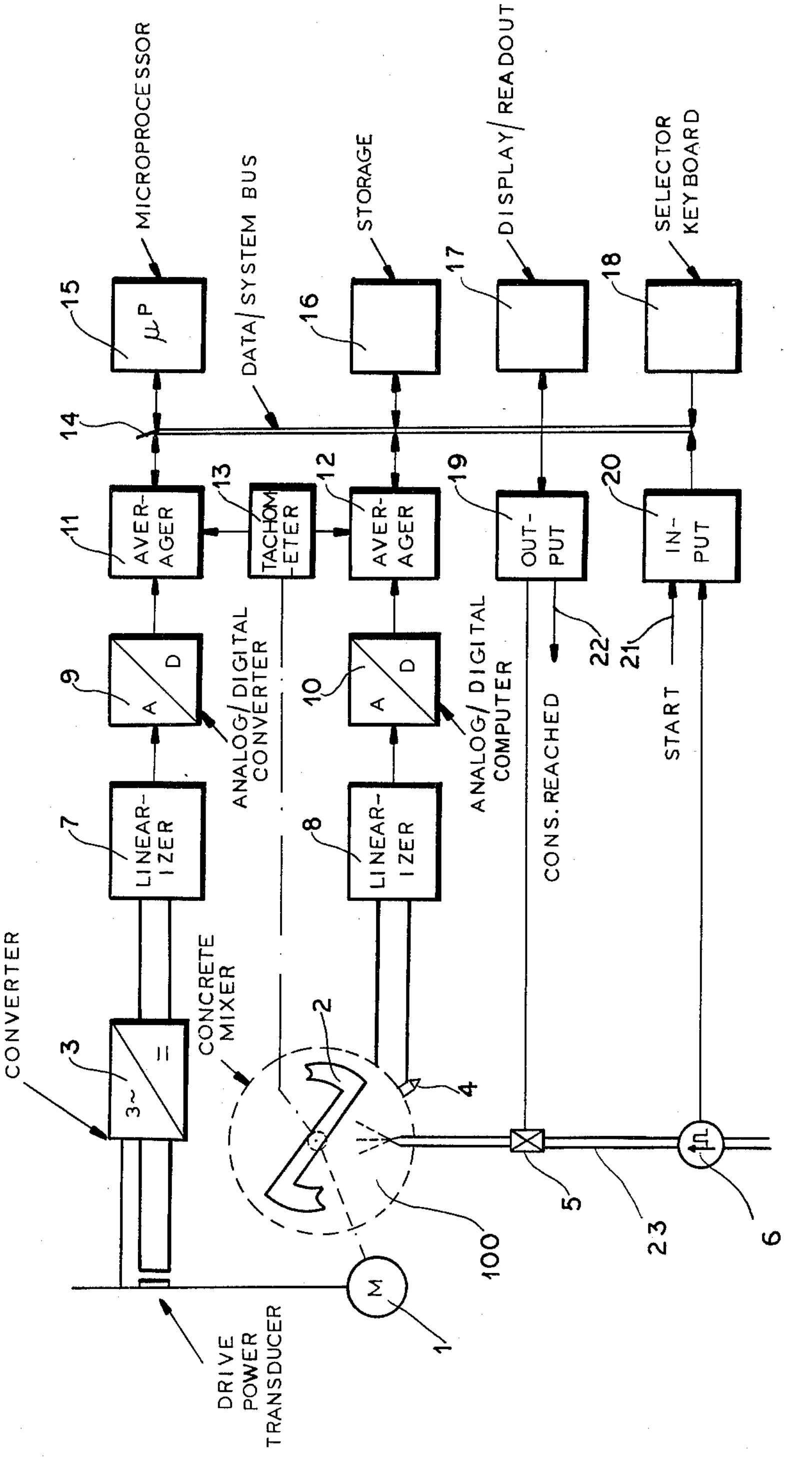
FIG. 2 is a block diagram of the apparatus for carrying out the method of the present invention.

In FIG. 2 we have shown a motor 1 which drives a rotary mixer 100 and has a transducer 3 responding to the power demand of the motor 1. Mixer 1 is provided with a plurality of measuring electrodes, one of which has been shown at 4, the electrodes providing measurements of the electrical resistance of the concrete mix.

In the consistency range K1, the electrical resistance of the mix is measured and from the beginning of the consistency range K2 the consistency is measured by the power required to operate the mixer. The latter measurement and the output from electrodes 4 are supplied to signal processors or linearizers 7 and 8 which produce electrical signals which are analog functions of the measurements. The measurements thus cover the entire control range and can be readily read out or serve to provide a precise control in which the measurement change per increment of consistency change is substantially constant.

The analog voltages are applied to analog/digital converters 9, 10 and are thereby digitalized.

The digital signals, upon which are superimposed perturbations synchronized with the rotation of the mixer and a function of the mixer speed, are applied to mean-value circuits 11 and 12 receiving inputs from the tachometer 13 synchronizing the mean-value circuits 11 and 12 with the rotation of the mixer and thereby generating an average value eliminating instantaneous extremes for each measuring period representing each rotation of the mixer.

This process, like the complete functioning of the apparatus, is controlled by a microprocessor 15, the connection between the various systems being effected by the data or system bus 14.

An input circuit is represented at 18 and is constituted by a selector keyboard which, in accordance with a predetermined code, can select a predetermined recipe from a multiplicity of previously recorded recipes and a batch quantity for which process data has been recorded and the selected process data is directly displayed on the readout 17.

When the solids of the mix are introduced into the mixer 100, a start command 21 is applied to the input port 20 which also receives a series of pulses from a transducer 6 constituting a water-increment counter.

Water supply is controlled by the output port 19 and the magnetic valve 5. When the selected consistency is achieved, an output signal is delivered at line 22.

For the first mixing of any particular recipe with a predetermined quantity of the respective components, the empirical values are stored in the table memory 16 and can be used for further corresponding mixtures.

Figure 3:
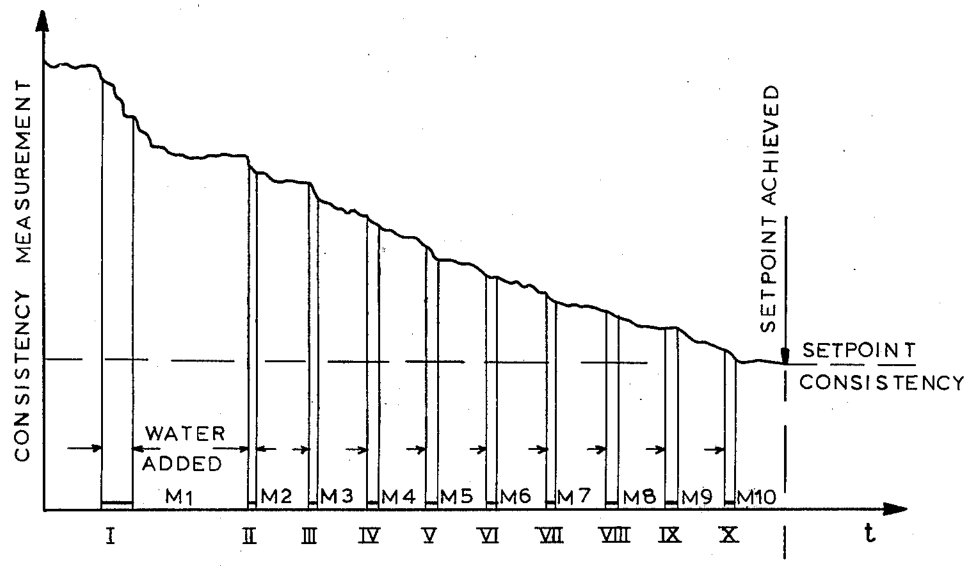
FIG. 3 is a diagram showing the operational sequence for obtaining the stored values.

FIG. 3 shows a diagram of the derivation of the empirical values in an initial mix operation.

If it is assumed that the recipe and the mix quantity is one for which there is no data in the memory 16, as determined by the keyboard 19 and the search of the memory of the microprocessor, automatically a prewater quantity reduced by the amount of water representing the highest possible moisture contents of the aggregates is introduced into the mixer as represented by the increment I and the mixing is conducted for the mixing time M1 which is present.

At the conclusion of this mixing time M1, the consistency and the actual volume of the water introduced are automatically stored as empirical values in the memory 16.

The microprocessor 15 then determines whether the desired consistency has been reached and if not, a predetermined second quantity of water II is added and mixing is effected for the shorter time M2.

At the expiration of this period, the instantaneous consistency measurement and previously supplied water quantity are stored in the memory as further empirical values. Again the microprocessor determines whether the set point consistency KS is reached or whether the consistency falls below this.

As shown in FIG. 3, this is not the case and the process is repeated with water-feed increments III and for mixing times M3 through M10 until the consistency set point value KS is achieved.

The same process is repeated whenever a new recipe and new quantity of the batch is initially prepared.

If it is now assumed that the batch is one for which a particular recipe and quantity has empirical values stored in the memory, e.g. a batch similar to that referred to in FIG. 3, the registration of the recipe and the quantity by the keyboard 18 will signal the microprocessor to utilize the recorded values.

In this case an unreduced larger prewater quantity I' is fed and the mixing time M1 is effected. In the manner described above, the total additional water quantity WR is ascertained from the empirical values in the table and the difference between the water required to reach KS from the measured consistency at the conclusion of the mixing period M1.

To calculate the additional water requirement WR, the table is searched for a consistency value above the instantaneously determined measured consistency and a consistency immediately therebelow and the corresponding water values are interpolated. The same of course applies for the preselected set point consistency which may be different from the original consistency KS. When the total quantity of additional water WR is added, the mixer is operated for the mixing time M1' which is controlled by the consistency measurement.

Figure 4:
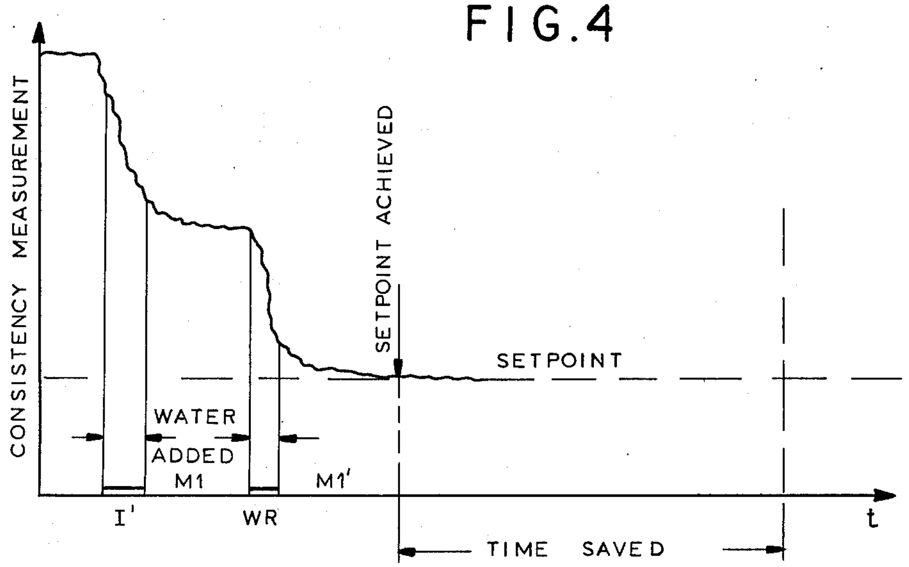
FIG. 4 is a diagram showing the operation utilizing the stored values.

As can be seen from FIG. 4, the total time to reaching the set point consistency can be reduced by about 50%, i.e. the amount of the time saved.

We claim:

1. A method of controlling the water added to concrete batches, comprising the steps of:

(a) determining for a given concrete recipe and batch size, while mixing same, a series of empirical values of water quantity and consistency of the resulting mix by initially feeding a quantity of water to the batch reduced by an amount equivalent to the moisture content of the aggregates of the batch at maximum intrinsic moisture content and thereafter incrementally adding water while measuring the consistency after each water addition;

(b) storing said values for the respective recipe and batch size; and (c) for the addition of water to a further batch of said recipe, while mixing the further batch:

(i) adding an initial quantity of water to said further batch which is not reduced by the quantity of water equivalent to the moisture contents of the aggregates, (ii) measuring the consistency of the further batch after the initial addition of water thereto, (iii) interpolating between stored water values corresponding to stored consistency values neighboring the measured consistency of step (ii) to obtain a first water quantity and interpolating between stored water values corresponding to stored consistency values for a set point consistency of the further batch to obtain a second water quantity, and obtaining an additional water quantity from the difference between said second and first water quantities, and (iv) adding said additional water quantity to said further batch in a single increment.

2. The method defined in claim 1 wherein empirical values corresponding to those in step (a) are stored for a plurality of concrete recipes and batch sizes with all said values being stored in a memory from which the empirical values can be read for a particular recipe.

3. The method defined in claim 1 or claim 2 wherein the measurement of consistency in step (a) is effected by different measurement methods in different portions of the range of consistency.

4. The method defined in claim 3 wherein one of the measurement methods determines the resistance of the batch.

5. The method defined in claim 3 wherein one of the measurement methods determines the loading of a drive for a concrete mixer in which the batch is mixed.

6. The method defined in claim 1 wherein an output signal representing the consistency is generated for each consistency measurement, further comprising electronically suppressing extremes of said signal.

7. The method defined in claim 1 wherein consistency measurements are obtained a plurality of times for each rotation of a concrete mixer in which the batch is mixed, further comprising the steps of averaging the measurements per rotation.

* * * * *